United States Patent [19]

Kirschner

[11] 4,396,138

[45] Aug. 2, 1983

[54] CARRYING RACK

[76] Inventor: H. William Kirschner, Rt. 5, Box 231, Vashon, Wash. 98070

[21] Appl. No.: 310,465

[22] Filed: Oct. 13, 1981

[51] Int. Cl.³ ............................................... B60R 9/04
[52] U.S. Cl. .................................. 224/318; 224/324; 224/325; 224/917; 211/60 SK
[58] Field of Search ............... 224/324, 311, 314, 318, 224/320, 321, 325, 327, 329, 917; 211/60 SK

[56] References Cited

U.S. PATENT DOCUMENTS

| | | |
|---|---|---|
| D. 242,114 | 11/1976 | Lange . |
| D. 256,009 | 7/1980 | Mendenhall . |
| 2,268,958 | 1/1942 | Parten et al. . |
| 2,574,018 | 11/1951 | Cotton . |
| 2,902,641 | 9/1959 | Peasley ............................ 224/318 |
| 2,988,253 | 6/1961 | Menghi . |
| 3,904,092 | 9/1975 | Piper . |
| 4,230,248 | 10/1980 | Finnegan .................... 211/60 SK X |

FOREIGN PATENT DOCUMENTS

| | | |
|---|---|---|
| 1150337 | 1/1958 | France . |
| 89566 | 7/1967 | France ............................... 224/324 |
| 603336 | 3/1960 | Italy ................................... 224/324 |

*Primary Examiner*—Steven M. Pollard
*Attorney, Agent, or Firm*—Christensen, O'Connor, Johnson & Kindness

[57] ABSTRACT

A carrying rack (10) is especially adapted to carry skis (12), poles (14) or other large items on a vehicle and includes an elongate cord (18) extending across the vehicle and hook members (20) for attaching ends of cord (18) to the vehicle. At least one bolster (22) is slidably engaged on cord (18). Each bolster (22) includes a vehicle engaging base (40) and a carrying platform surface (52) spaced above the base (40) to support skis (12). An abutment wall (56) extends upwardly from platform surface (52) to laterally support skis (12). Each bolster (22) also includes a hook section (64) and a ledge portion (63) for supporting poles (14). A clamping line (24) is formed as a continuous loop to extend around anchor line (18), up through hole (54) formed in platform surface (52), and over the top of skis (12) and poles (14) to latch with hook section (64). Clamping line (24) tightly grips anchor cord (18) to prevent bolster (22) from sliding along the length of anchor line (18).

19 Claims, 7 Drawing Figures

CARRYING RACK

DESCRIPTION

1. Technical Field

The present invention relates to a vehicle top carrier, more particularly to an adjustable rack for securing skis, boats, canoes or similar items to the roof of an automobile or other type of vehicle.

2. Background Art

The prior art includes various devices for carrying loads on the roof of an automobile, including rigidly constructed racks. One such rack is disclosed in U.S. Pat. No. 2,268,958, wherein a luggage carrier is constructed in the form of a clamp having a fixed lower bar extending transversely across the vehicle roof and an upper bar hinged to one end portion of the lower bar. A plurality of spaced apart feet extend downwardly from the lower bar to rest on the top of the vehicle. The rack is anchored to the vehicle with a spring-loaded wire cable extending outwardly from each end of the lower bar and fitted with a hook for engaging with the vehicle rain gutter. In use, two carriers are spaced apart along the length of the vehicle roof to clamp elongate members, such as skis, between the hinged upper and lower bars. A latch is pivotally mounted on the lower bar to hook over the free end of the upper bar to clamp the skis between the two bars.

Another rigid luggage rack is disclosed in U.S. Pat. No. 2,574,018, wherein the rack includes a substantially rigid, flat, elongate base bar extending transversely across the roof of the vehicle. A roof gutter engaging hook is attached to each end of the base bar by a wire loop to anchor the bar to the vehicle. To distribute the weight carried by the base bar over the top of the vehicle roof, a flexible, elongate foot member extends beneath and substantially along the entire length of the base bar. The center of the foot is rigidly fixed to the center of the base bar. The curvature of the foot is adjustable to correspond to the shape of the vehicle roof through the use of screws which extend downwardly from the underside of the base bar to push against the upper surface of each end of the foot. The stand out of the screws may be varied to change the curvature of the foot. Luggage or other items are secured to the base bar by lashing ropes which may be tied to wire loops disposed at each end portion of the base bar.

A flexible ski rack is disclosed in U.S. Pat. No. Des. 256,009 comprising a plurality of rigid segments linked together to permit the rack to curve along its length to conform to the transverse curvature of the vehicle roof. A hook is fixed to each end of the rack to engage with the roof gutters of the vehicle. A tie-down loop is anchored to the end of each rack segment to detachably engage with a downwardly open hook fixed to the opposite end of the rack segment to hold a ski against the upper surface of the rack segment.

Another flexible cartop carrier is disclosed in French Pat. No. 1,150,337 which includes an elongate elastic cord extending transversely across the vehicle top. Hooks are fixed to each end of the cord to engage with the vehicle roof gutters. A central portion of the cord is pulled upwardly through a doughnut-shaped washer to form a loop positionable around articles to be carried. A drawback of this particular type of cartop carrier is that the tension on the cord is dependent upon the size of the item carried by the carrier, and thus with small diameter items such as a fishing pole, the cord may be very loose while it may not be elastic enough to accommodate larger items such as a boat or canoe.

U.S. Pat. No. 2,988,253 discloses a flexible ski rack composed of a plurality of lugs mounted on a flexible, non-elastic cord which extends across the roof of the vehicle to anchor with the vehicle roof gutters. Each of the lugs is formed generally in the shape of an inverted cup having a pair of platforms divided by an upstanding central ridge. The edges of a ski are adapted to rest on each platform. A looped elastic cord, anchored to one side of each lug, loops over the skis to engage with a hook formed on the opposite side of the lug. A particular drawback of this type of rack is that no provision exists for preventing the lugs from shifting along the length of the strap and thus moving across the roof of the vehicle.

It is a principal object of the present invention to provide a rack having load-carrying bolsters which are automatically locked to a hold-down cord when skis or other items are clamped to the bolster. It is a further object to provide such a rack which is readily foldable to a compact size for convenient storage. It is still another object to provide such a rack which is adjustable to carry such diverse loads as skis, ladders and boats.

DISCLOSURE OF INVENTION

The rack of the present invention includes an elongate, elastic anchor cord which extends transversely across the roof of a vehicle and has a hook member fixed to each of its ends for engaging with the vehicle roof gutters. At least one load supporting bolster is slidably threaded on the anchor cord. The location of the bolsters may be selectively adjusted depending on, for instance, the width of the vehicle top or the width of the load to be carried.

Each bolster is made from thin wall material shaped to form an elongate, transversely extending, substantially flat base. Non-skid vehicle roof protective cushions are attached to the underside of the base to prevent the bolster from sliding, scuffing, or otherwise damaging the vehicle roof. The bolster also includes a transversely elongate platform surface spaced above the base for supporting a load, such as a pair of skis disposed in edgewise, side-by-side relationship to each other. In the preferred embodiment, the skis rest against an upright abutment wall which extends upwardly from one end of the platform surface. The bolster is formed with a downwardly open hook disposed on the side of the abutment wall opposite the platform surface and with a carrying ledge portion disposed above the hook also on the side of the abutment wall opposite the platform surface. The carrying ledge is adapted to carry small diameter articles thereon, such as ski poles.

An elastic clamping line is provided for clamping the carried articles to the bolsters. The clamping line includes a first end which extends beneath the platform surface and around the anchor cord. The opposite end of the clamping line is engageable with the hook in such a manner that the intermediate portion of the line extends over the carried articles positioned on the platform surface to elastically clamp them to the bolster. Engaging the first end of the clamping line with the anchor cord not only anchors the line, but also synergistically causes the clamping line to grip the anchor cord and press it upwardly against the underside of the platform surface to prevent relative sliding movement between the bolster and the anchor cord.

To carry elongate articles, such as skis, a pair of carrying racks are spaced longitudinally on the motor vehicle. At least two bolsters, and preferably four, are normally attached to each anchor cord so that the bolsters on the forward and rear carrying racks may be adjustably positioned along the length of the anchor cord to support relatively broad items, such as the edges of a surfboard or the gunnel of an overturned boat. When used to carry such larger articles, a longer clamping line may be provided to span the width of the article.

It will be appreciated that the construction of the carrying rack of the present invention allows quick and convenient adjustment to carry items of varying widths or a plurality of slender articles such as skis. Once the load carrying bolsters are adjusted in position, they are automatically prevented from sliding relative to the anchor cords when loaded by the gripping action of the stretched elastic clamping lines on the anchor cord. When not in use, the carrying rack may be arranged in a very compact package and conveniently stored in the vehicle so as to be readily available when again needed.

BRIEF DESCRIPTION OF THE DRAWINGS

The details of one typical embodiment of the present invention will be described in connection with the accompanying drawings in which.

BEST MODE OF THE INVENTION

Figure 1:
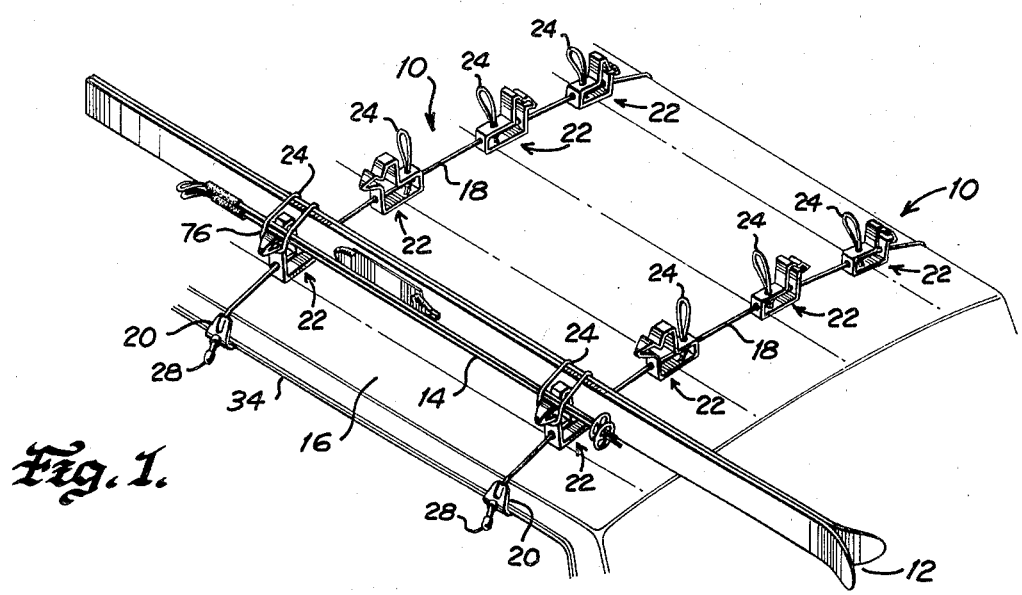
FIG. 1 is an isometric view of a carrying rack constructed according to the present invention illustrated as mounted on the top of a motor vehicle and carrying a pair of skis.

Referring initially to FIG. 1, a pair of carrying racks 10 constructed according to the best mode of the present invention currently known to applicant is shown carrying a pair of skis 12 and a pair of ski poles 14 on the roof 16 of a motor vehicle. Each rack 10 includes an elongate anchor cord 18 extending transversely across the vehicle roof and anchored to the roof gutters of the vehicle by hook members 20. Four bolsters 22 are slidably threaded on each anchor cord 18, with the corresponding bolsters of the longitudinally spaced apart racks 10 being disposed in alignment with each other to support the skis 12 and poles 14. An elastic clamping line 24 is provided for each bolster 22 to secure clamp the skis and poles to the bolster and to simultaneously prevent the bolsters from sliding along the length of anchor cord 18.

As shown in the drawings, anchor cord 18 is nominally shorter than the width of vehicle roof 16 and is constructed from elastic material which is stretched into taut condition when rack 10 is mounted on the vehicle. It will be understood, however, that non-elastic cord of suitable length could also be used with appropriate modification of hook members 20.

Although cord 18 is illustrated as circular in cross section, it may be formed in other cross-sectional shapes, such as square or rectangular. Preferably the outer surface of cord 18 is composed of a nonabrasive material so as not to scratch or cause other damage to vehicle roof 16. A stop ring 26 is clamped or otherwise fixedly attached to each end portion of cord 18 at a location outwardly of hook members 20 to prevent disengagement of the hook members from the cord. Although not essential, a protective end cap 28 is preferably engaged over the ends of cord 18.

Figure 2:
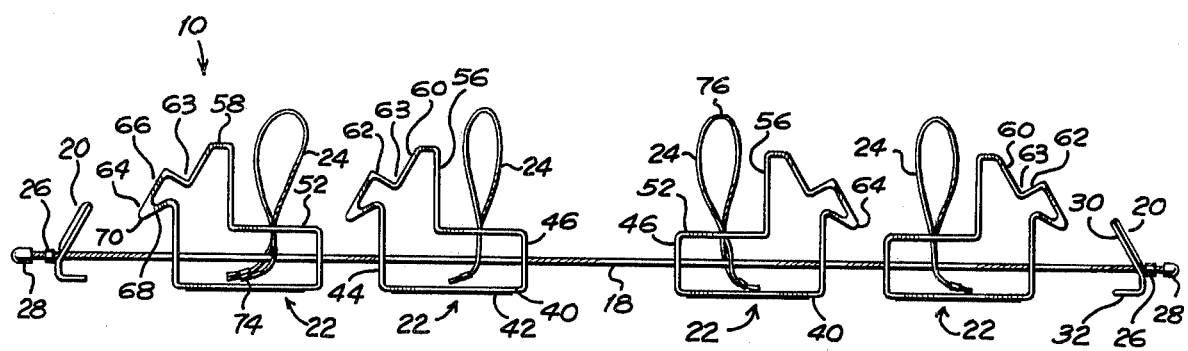
FIG. 2 is an enlarged front elevation view of a carrier rack including four bolsters slidably threaded on an anchor cord.
Figures 6, 7:
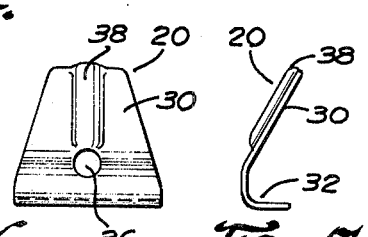
FIG. 6 is an enlarged end elevation view of a hook member illustrated in FIGS. 1 and 2.
FIG. 7 is a side elevational view of the hook member of FIG. 6.

As most clearly illustrated in FIGS. 2, 6 and 7, each hook member 20 is constructed with a generally planar shank portion 30 formed in the shape of a truncated triangle and a curved portion 32 which is adapted to engage gutter 34 on the edge of vehicle roof 16. Hook member 20 includes a central, circular hole 36 formed in shank portion 30 adjacent curved end portion 32 for receiving tha anchor cord 18 therethrough. Hole 36 is sized to permit free sliding movement of hook member 20 along cord 18 but to prevent passage of stop ring 26 through the hole. The central, longitudinal portion of hook shank portion 30 is curved or bowed in the upward direction to form a channel 38 extending centrally and longitudinally along the shank portion. The transverse curvature of channel 38 is sized to receive anchor cord 18 therein to thereby position the anchor cord relative to hook member 20 and to prevent the hook from contacting the roof of the vehicle. Ideally hook members 20 are either constructed from a nonabrasive material or covered with a nonabrasive material such as rubber or resilient plastic to prevent damage to gutters 34 or vehicle top 16.

Referring to FIGS. 1–5, each bolster 22 is shown constructed in a hollow, lightweight, rigid shape from thin walled material. Each bolster 22 includes a substantially flat, rectangularly shaped base 40 extending along the length of and beneath cord 18 to overlie vehicle roof 16. Constructing base 40 in this manner provides bolster 22 with a relatively large bearing surface for distributing the load carried by the bolster over the area of vehicle roof 16. A thin layer of cushion material 42 is attached, such as by gluing, to the underside of base 40 to prevent scratching of the vehicle top finish and to help prevent the bolster from sliding along the vehicle top. Cushion material 42 may be formed from rubber, neoprene, urathane or similar materials.

Figure 3:
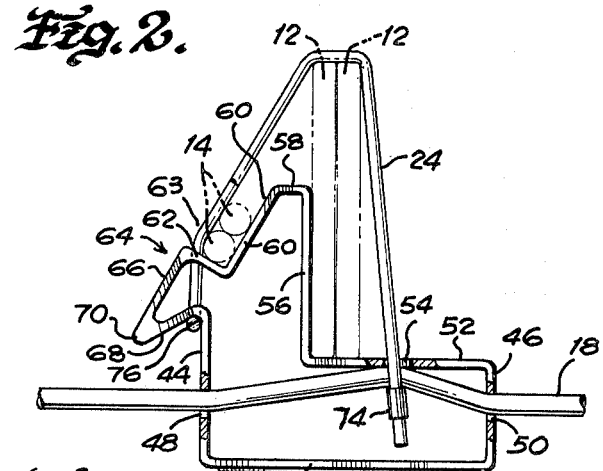
FIG. 3 is an enlarged, fragmentary, front elevation view of a bolster including a pair of skis and a pair of ski poles, shown in phantom line, mounted thereon.

Each bolster 22 also includes side walls 44 and 46 extending upwardly from each end of base 40 in spaced parallel relation to each other. Aligned holes 48 and 50 are formed in sidewalls 44 and 46, respectively, to slidably receive anchor cord 18. As shown, holes 48 and 50 are located transversely centrally along the width of the sidewalls and at an elevation approximately midway along the height of sidewall 46. A platform surface 52 extends horizontally from the upper edge of side wall 46 to overlie and extend parallel to a major portion of the length of base 40. As illustrated in FIGS. 1 and 3, platform surface 52 serves to support articles, such as skis 12, carried by bolsters 22. A hole 54 extends downwardly through platform surface 52. Preferably hole 54 is located centrally along the width of platform 52 in alignment with the center of holes 48 and 50.

An abutment wall 56 extends vertically upwardly from the end of platform surface 52 opposite sidewall 46. As illustrated in FIG. 3, abutment wall 56 laterally supports skis 12. As shown, a top edge wall 58 extends a short distance transversely from the upper edge of abutment wall 56 to intersect with a sloped first ledge wall 60 which extends downwardly and laterally outwardly from the top edge wall. The flat surface of top edge wall 58 allows it to be used in concert with like surfaces of other bolsters as a support for loads which are wider than the vehicle roof, as will be described more completely hereafter. The lower edge of the first ledge wall intersects with a second sloped ledge wall 62 which extends laterally outwardly and diagonally upwardly from the lower edge of the first ledge wall. The first and second ledge walls cooperate together to form a ledge area 63 which is adapted to support ski poles 14.

Figure 4:
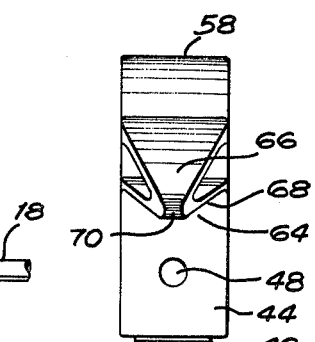
FIG. 4 is a left side elevation view of the bolster of FIG. 3.
Figure 5:
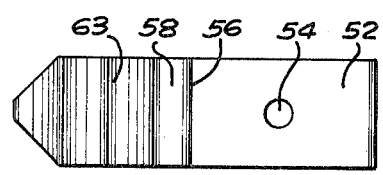
FIG. 5 is a plan view of the bolster of FIGS. 3 and 4.

Ledge wall 62 forms the upper portion of a generally nose-shaped hook section 64 of each of the bolsters. Hook section 64 also includes an upper wall 66 extending diagonally downwardly from the edge of ledge wall 62 and a lower wall 68 extending diagonally downwardly and outwardly from the upper edge of side wall 44. Upper wall 66 and lower wall 68 intersect each other at a rounded corner or tip 70. As illustrated in FIGS. 1, 4 and 5, upper wall 66 and lower wall 68 are tapered toward tip 70 to form tip 70 of a width which is substantially narrower than the width of the remainder of bolster 22.

Next, turning to FIGS. 1-3, the present invention also includes an elastic clamping line 24 associated with each bolster 22 to clamp articles such as skis 12 and poles 14 to the bolsters. The ends of the clamping line, disposed below cord 18, are joined together by a tie member 74 to form the clamping line into a continuous loop. The tie member is fixedly attached to the ends of the clamping line, such as by crimping. The clamping line loops downwardly around the portion of anchor cord 18 extending between bolster sidewalls 44 and 46 and passes upwardly through platform hole 54 to extend over the top of skis 12 and poles 14 to engage with hook 64 thereby securely holding the skis and poles in place. The tapered shape of hook section 64 allows the user to conveniently hook and unhook the clamping line even when wearing a ski glove or similar protective wear.

Looping line 24 around cord 18 ensures that the line cannot become detached from the bolster and lost. It will be further appreciated that looping line 24 around cord 18 not only anchors the line, but also causes the line to tightly grip the cord 18 when clamping line 24 is extended over the tops of skis 12 and poles 14 and engaged with hook section 64.

As shown in FIG. 3, line 24 pulls cord 18 upwardly against the underside of platform 52 while also causing the cord to press against the edges of holes 48 and 50 of the bolster sidewalls. The friction created by these contacts, as well as the friction created by the surface to surface contact between line 24 and cord 18, all act to prevent bolster 22 from sliding along cord 18.

As mentioned earlier, bolsters 22 are also provided with a non-skid cushion material on their roof contacting surface and in the preferred embodiment the bolsters are held in some compression against the roof surface by the stretching of cord 18 and the weight of the load being carried. It has been found, however, that air pressure generated by high speed movement of a motor vehicle tends to lift articles carried on a roof top carrier upwardly off of the vehicle roof thus negating these compression forces and allowing the bolsters to move longitudinally on their attaching cords. The crimping of cord 18 by the looped clamping line 24 to prevent movement of the bolsters in these conditions presents a novel solution to this problem and a distinct improvement over known prior art.

Although clamping lines 24 are each formed as a single loop, they can instead be constructed with separate loops at each end, one to extend around anchor cord 18 and the other to catch with hook section 64. Other obvious structural modifications could be made to the present invention to accomplish the purpose thereof and are considered to be within the scope of this invention.

FIGS. 1 and 2 disclose four bolsters 22 threaded on a clamping line 18 with the two bolsters on each half of the line facing oppositely relative to the other two bolsters so that their hook sections 62 face outwardly toward the sides of vehicle roof 16. Orienting the bolsters in this manner makes it easier for the user to engage and disengage clamping lines 24 from hook sections 64 while standing at the side of the vehicle. It will be understood that rather than utilizing four bolsters on each line 16, a fewer or greater number of bolsters may be employed depending on the needs of the user and the width of the vehicle on which the racks are mounted.

It will be understood that racks 10 may be utilized to carry articles other than skis and poles, such as a sheet of plywood, surfboards, boats, ladders or canoes. To carry, for instance, a surfboard, a pair of racks 10 may be longitudinally spaced along vehicle roof 16 with a pair of oppositely facing bolsters on each rack being adjusted so that platform surfaces 52 underlie the side edges of the surfboard. The bolsters may be fitted with elastic clamping lines which are longer than lines 24 illustrated in FIGS. 1-3 so that they span the width of the surfboard and engage with the hook section of the opposite bolster, or extend completely around the surfboard to engage their own bolster hook. When bolsters 22 are used in this manner, the clamping lines also function not only to clamp the surfboard to the bolsters, but also to tightly grip anchor cord 18 to prevent relative movement between the anchor cord and the bolster in the same manner as described above.

When wide items, such as a sheet of 4 foot by 8 foot Plywood, are carried on the present rack, it may also be desirable to employ an additional non-elastic holddown strap to prevent the load from being lifted from the vehicle roof by air pressure as the vehicle picks up speed. A non-elastic strap of adjustable length which may be hooked to the roof gutters of the vehicle and tightened over the top of the load has been found satisfactory.

As will be apparent to those skilled in the art to which the invention is addressed, the present invention may be embodied in forms and embodiments other than those specifically disclosed above, without departing from the spirit or essential characteristics of the invention. The particular embodiment of the carrier rack 10 described above is therefore to be considered in all respects as illustrative and not restrictive, i.e. the scope of the present invention is as set forth in the appended claims rather than being limited to the example of the carrier rack 10 as set forth in the foregoing description.

What is claimed is:

1. A carrying rack for a motor vehicle, comprising:
   an elongate, anchor cord extendable transversely across the vehicle and anchorable to the vehicle;
   at least one bolster slidably movable on said anchor cord, said bolster including:
   a vehicle engaging base;

a carrying platform surface spaced above said base and above said anchor cord;

hook means disposed adjacent one side of said platform surface; and, elastic clamping line means having a first end extending beneath said platform surface and around said anchor cord and a second end engageable with said hook means such that the intermediate portion of said clamping line means extends over the carried article positioned on said platform surface to elastically clamp said carried article to said bolster and such that the first end of said elastic clamping line grips said anchor cord to prevent relative sliding movement between said bolster and said anchor cord when an article is being carried.

2. The carrying rack of claim 1, wherein said carrying platform surface includes an abutment wall extending upwardly therefrom.

3. The carrying rack of claim 2 wherein said hook means is disposed on one side of said abutment wall.

4. The carrying rack according to claim 3, wherein said bolster further includes a carrying ledge portion disposed above said hook means on the side of said abutment wall opposite said platform surface, said ledge also being adapted to carry articles held thereon by said clamping line means.

5. The carrying rack according to claim 4, wherein said ledge is diagonally sloped.

6. The carrying rack of claim 1, wherein said elastic clamping line means is loop-shaped.

7. The carrying rack according to claim 1, wherein said bolster base is formed in a generally flat, elongate shape.

8. The carrying rack according to claim 7, further including non-skid cushion means disposed beneath said bolster base to help prevent the bolster from sliding relative to the vehicle and to prevent damage to the vehicle.

9. The carrying rack according to claim 1 wherein a pair of carrying racks are spaced longitudinally on a motor vehicle to carry a pair of skis.

10. The carrying rack according to claim 1, wherein said elastic clamping line means first end presses said anchor cord against the underside of said platform surface when said clamping line means second end is engaged with said hook means.

11. The carrying rack according to claim 1, wherein said bolster is constructed from a continuous length of substantially constant width thin wall material curved to integrally form said base, said platform surface, said abutment wall and said hook means.

12. A pair of racks adapted to be spaced longitudinally on a motor vehicle to carry a pair of skis, each of said racks comprising:

an elongate anchor cord extendable transversely across the vehicle, said anchor cord having a hook member fixed to each end thereof for engagement with the vehicle;

at least one bolster slidably movable on said anchor cord, said bolster including:

a generally flat, vehicle engaging base;

a carrying platform surface spaced above said base and said anchor cord for supporting a pair of skis disposed on edge and in side-by-side relationship to each other;

an abutment wall extending upwardly from one end of said platform surface to transversely support said skis; and, elastic clamping line means having a first end extending beneath said platform surface and around said anchor cord and a second end engageable with said hook means such that the intermediate portion of said clamping line extends over the skis positioned on said platform surface to elastically clamp the skis to said bolster while gripping said anchor cord to prevent relative sliding movement between said bolster and said anchor cord.

13. The ski rack according to claim 12, wherein said elastic clamping line means first end presses said anchor cord against the underside of said platform surface when said clamping line means second end is engaged with said hook means.

14. The ski rack according to claim 12, wherein said elastic clamping line means is loop-shaped.

15. The ski rack according to claim 12, further including non-skid cushion means disposed beneath the base of each of said bolsters to help prevent the bolsters from sliding relative to the vehicle roof and from damaging the vehicle surface.

16. The ski rack according to claim 12, wherein said bolster further includes a carrying ledge portion disposed above said hook means on the side of said abutment wall opposite said platform surface, said ledge portion being adapted to carry ski poles held thereon by said clamping line means.

17. The ski rack according to claim 16, wherein said ledge portion is diagonally sloped downwardly in a direction toward said abutment wall.

18. The ski rack according to claim 12, wherein each of said bolsters is constructed from a continuous length of substantially constant width, thin wall material curved to integrally form said base, said platform surface, said abutment wall, and said hook means.

19. A pair of carrying racks adapted to be spaced longitudinally on a motor vehicle, each of said racks comprising:

an elongate elastic anchor cord extendable transversely across the vehicle, said cord having anchor members fixed to each end thereof for engagement with the vehicle;

a pair of oppositely facing bolsters slidably movable on said anchor cord, each of said bolsters including:

a vehicle engaging base;

a carrying platform spaced above said base and above said anchor cord;

an abutment wall extending upwardly from the end of said platform base distal from said other bolster;

hook means disposed on the side of said abutment wall opposite said platform base; and elastic clamping line means having a first end extending beneath said platform surface and engaging said anchor cord and a second end engageable with the hook means of opposite bolster such that the intermediate portion of said clamping line means extends over a carried article positioned on the platform surfaces of said bolsters to elastically clamp said carried article to said bolsters in a manner such that the first end of said elastic clamping lines grip said anchor cord to prevent relative sliding movement between the bolsters and said anchor cord when an article is being carried.

* * * * *